April 29, 1941. H. T. LAMBERT 2,240,219
BRAKE CONSTRUCTION
Filed Nov. 20, 1940 4 Sheets-Sheet 2
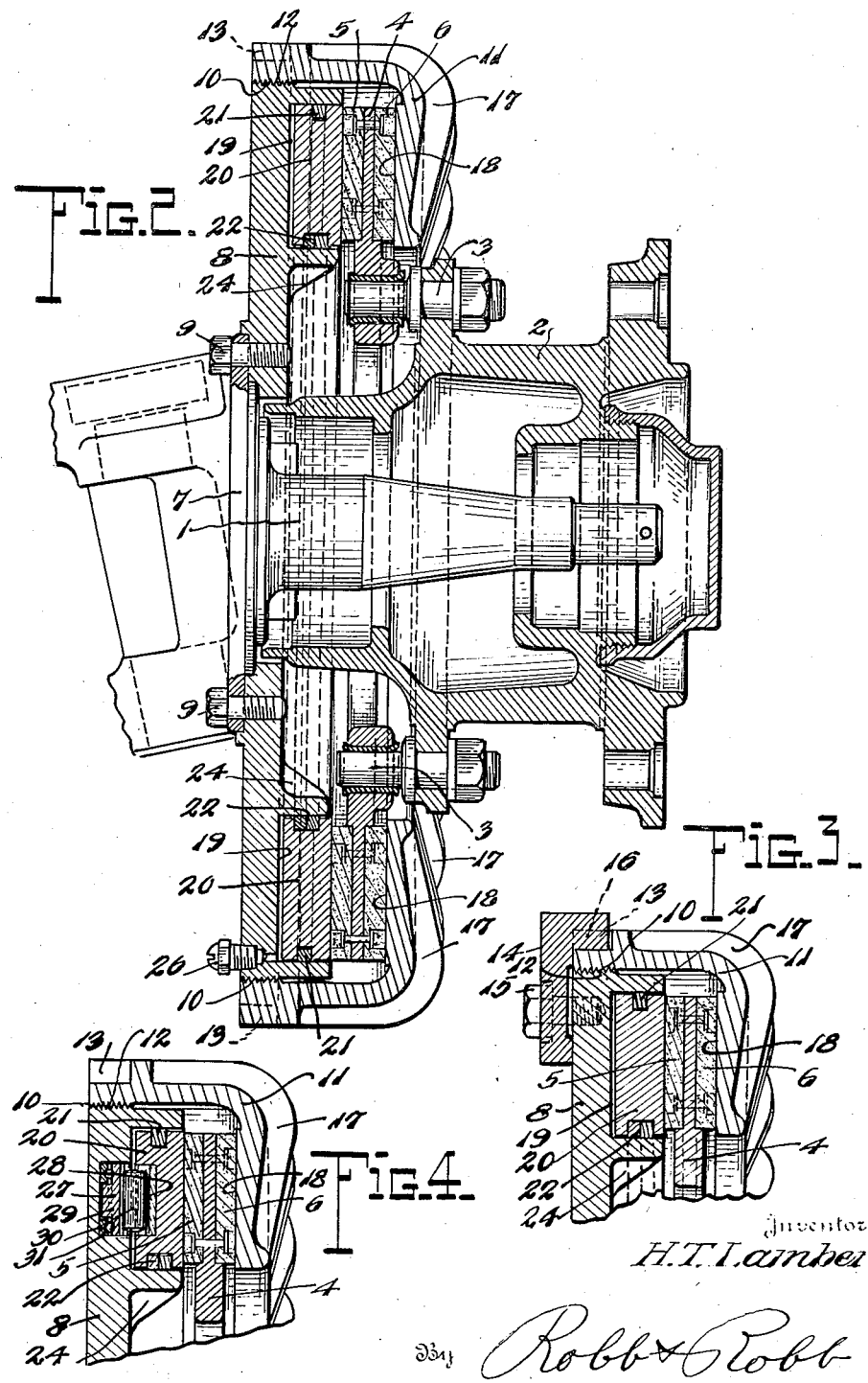
Inventor
H. T. Lambert
By Robb & Robb
Attorneys

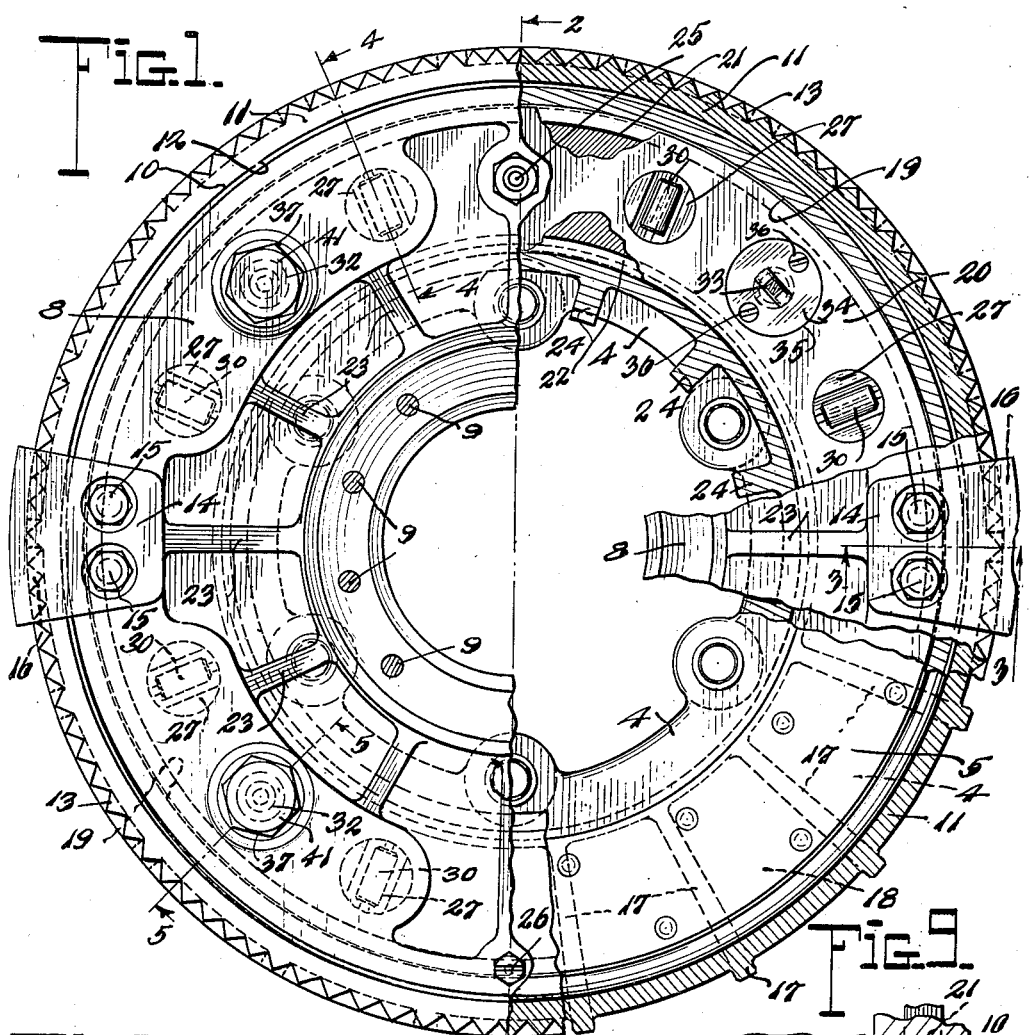

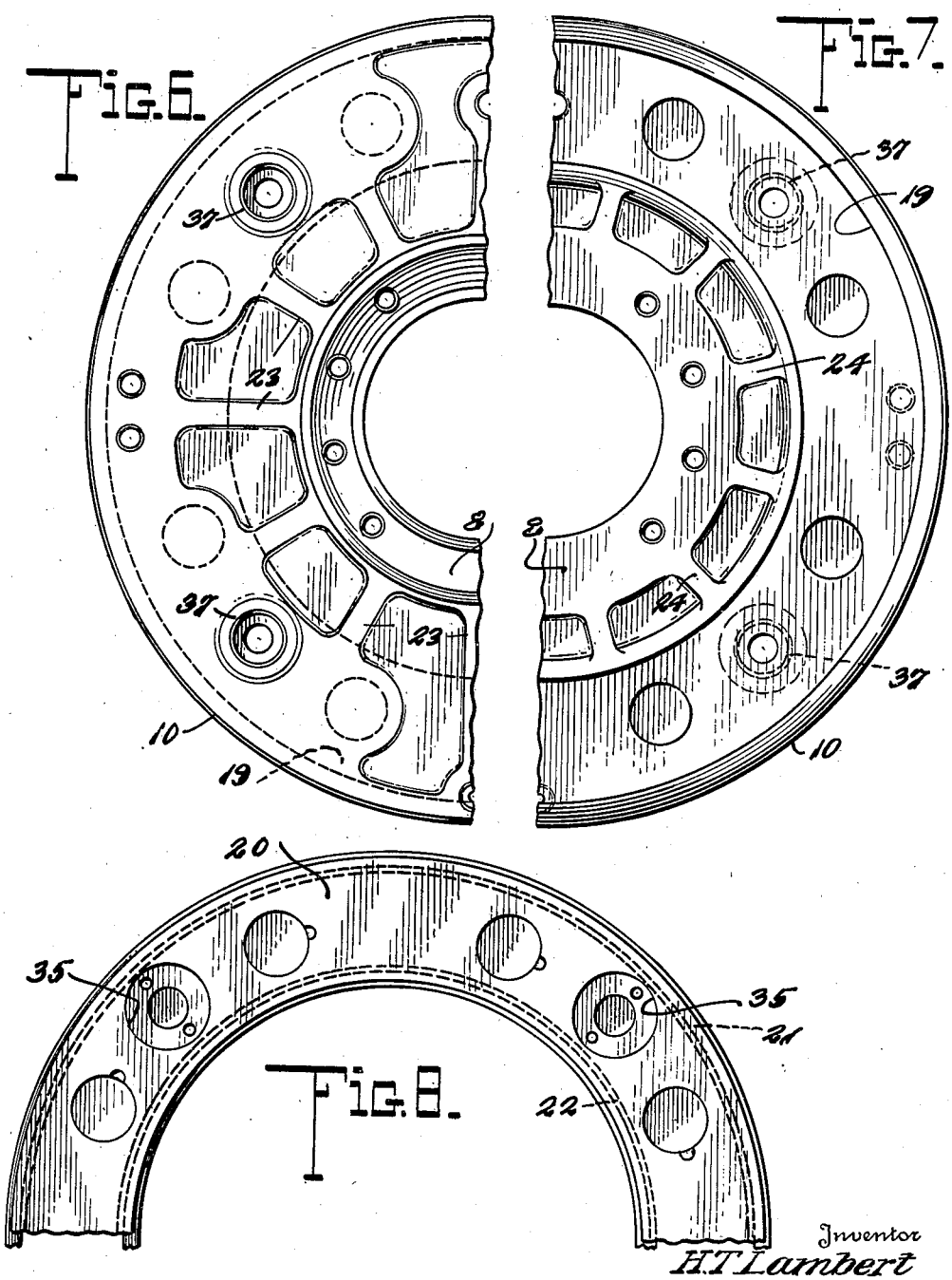

April 29, 1941. H. T. LAMBERT 2,240,219
BRAKE CONSTRUCTION
Filed Nov. 20, 1940 4 Sheets-Sheet 4
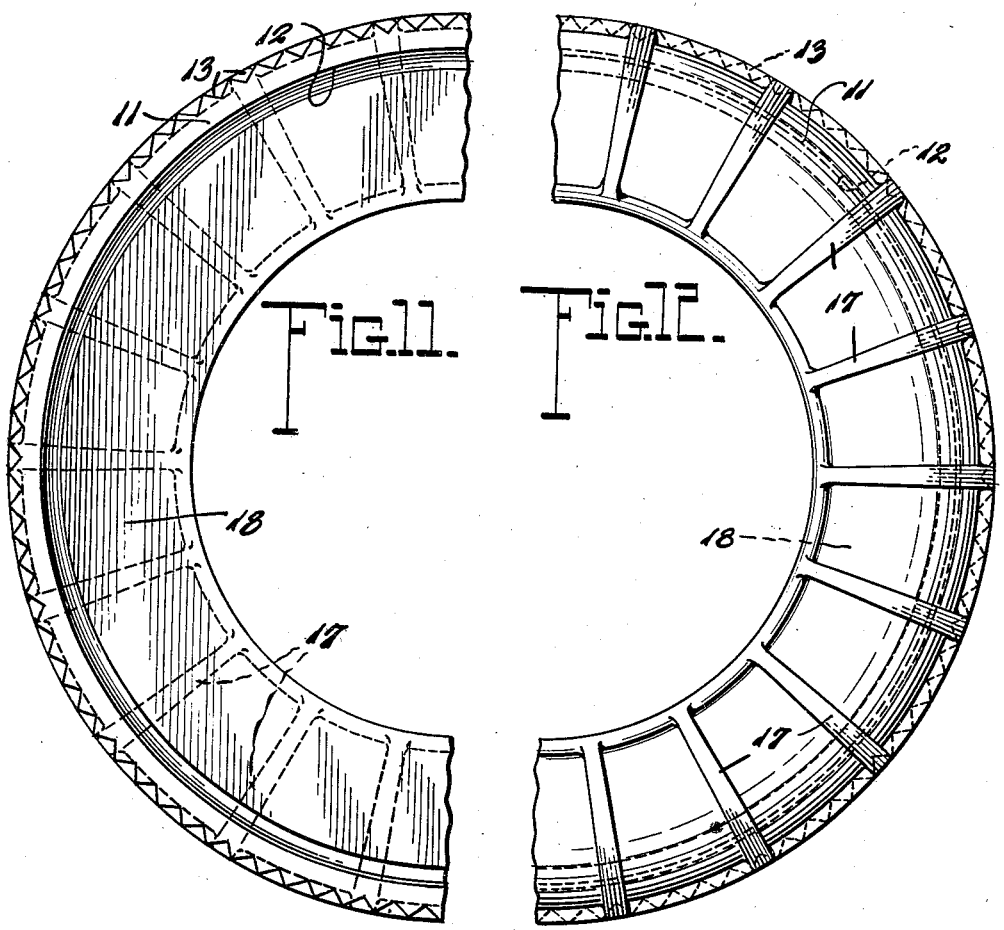
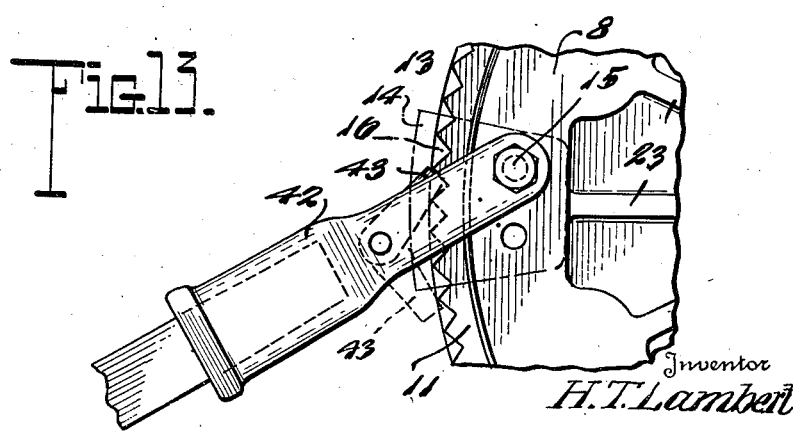

Patented Apr. 29, 1941

2,240,219

UNITED STATES PATENT OFFICE 2,240,219

BRAKE CONSTRUCTION

Homer T. Lambert, St. Joseph, Mich.

Application November 20, 1940, Serial No. 366,459

18 Claims. (Cl. 188—72)

This invention relates to brake constructions, and more particularly to fluid-operated disc brakes and the like.

In the hydraulic type of fluid-operated brakes a small power cylinder is commonly used requiring a very high operating pressure. Leakage must be prevented, as any leakage of the brake-operating fluid renders the brake less efficient, particularly if the fluid gets onto the braking surfaces. This leakage is likely to occur aft the brakes have been in use over a considerable length of time, due to wear of the parts and heat created by the braking actions, and may require relining of the brakes as well as extensive replacements of the brake-operating parts.

An object of my invention is, therefore, to eliminate these faults and disadvantages by utilizing air or some similar compressible fluid medium under a comparatively low pressure to effect a preliminary braking force on the brake elements which subsequently produces a servo braking action of great magnitude on the braking elements.

A further object is the provision in a disc type brake of an annular piston member mounted in an annular cylinder, the piston member constituting one of the braking elements and operating directly against a rotary member to be braked. This piston braking member is mounted for a limited relatively rotary movement with respect to the cylinder, and a servo mechanism is located in the cylinder for producing additional or servo braking pressure on the piston and the member to be braked incident to the relative rotary movement aforesaid.

Another object is the provision of an annular piston having a braking surface at one side and a relatively large fluid pressure head operating area at its other side equal at least to the braking surface area aforesaid.

A further object is the provision of a simple disc type brake having a supporting disc-shaped member on which is rotatably adjustable a flanged disc braking member having a notched periphery, and the provision of a notched locking plate removably secured to the disc-shaped member for engagement with the notched periphery of the flanged disc to prevent relative rotation between the supporting disc and the flanged disc, and in addition a ratchet lever which is substituted for the locking plate and secured by the locking plate fastenings for making an adjustment of the flanged disc. The ratchet lever is engageable with the notched periphery of the flanged disc to rotate the same on the supporting disc member.

A still further object is the provision of a servo brake including a rotary member to be braked, a supporting disc-like member disposed at one side of the member having an annular braking cylinder therein near its periphery, and an apertured flanged backing plate adjustably secured to the supporting disc at the other side of the rotary member to be braked, together with an annular braking piston disposed in the cylinder and movable toward the member to be braked for a preliminary braking action, and the provision of servo braking means disposed within the cylinder and operable by the preliminary braking action to provide servo braking action.

A still further object is the provision of tensioning means between the annular piston and the supporting disc which extends into the pressure cylinder for retracting the piston away from the member to be braked when the pressure of the pressure fluid medium within the annular cylinder is reduced.

A further object is the provision of a plurality of spaced servo-operated camming means mounted within the annular pressure cylinder, each comprising opposed camming inserts disposed respectively in the base of the cylinder and in the cylinder side of the annular piston, one of said inserts being fixed against rotation and the other insert being mounted on anti-friction means for free rotation, and tensioning means intermediate the camming inserts and extending within the cylinder for exerting retracting pressure on the piston within the cylinder.

Other and further objects and advantages of the invention will be hereinafter set forth and the novel features thereof defined by the appended claims.

In the drawings:

Figure 1 is a side elevation of my improved fluid-pressure operated servo brake taken from the "mounting" side, parts being broken away and shown in section to more clearly show the inner details thereof;

Figure 2 is a vertical sectional view taken about on a plane indicated by the line 2—2 of Figure 1, with the brake applied to a vehicle wheel, and showing the front wheel supporting structure, the wheel bearings, and portions of the wheel being omitted;

Figure 3 is a fragmentary sectional view taken on the line 3—3 of Figure 1, looking in the direction of the arrows, and disclosing the locking plate for the supporting disc and flanged backing plate;

Figure 4 is a fragmentary sectional view on the line 4—4 of Figure 1, and disclosing the servo camming inserts within the annular cylinder of the supporting disc member;

Figure 5 is a sectional view taken about on the line 5—5 of Figure 1, and showing the piston retracting tension member extending into the annular cylinder of the supporting disc;

Figures 6 and 7 are fragmentary views in elevation of the front and the inside respectively of a half portion of the supporting disc member;

Figure 8 is a fragmentary view of one-half of the annular relatively rotatable piston braking member disclosing particularly the recesses for the camming inserts and the intermediate recesses for the piston retracting tension members;

Figure 9 is a detailed sectional view taken through one of the camming insert units at right angles to the line 4—4 of Figure 1, one-half of each insert and the camming roller being shown in elevation;

Figure 10 is a detailed sectional view on the line 10—10 of Figure 9;

Figures 11 and 12 are side elevations of one-half of the adjustably apertured backing plate, and showing respectively the interior and exterior thereof; and Figure 13 is an enlarged detailed view on the ratchet actuating lever for adjusting the flanged disc on the stationary supporting disc.

Like reference characters designate corresponding parts in the several figures of the drawings.

Referring more particularly to Figures 1 and 2, wherein my improved brake is shown applied to the front or steering wheel portion of a vehicle, the numeral 1 indicates the steering axle and 2 the wheel hub carried thereby, the supporting bearings and wheel proper being omitted. The wheel hub 2 is provided with conventional driving lugs 3 on which is mounted the rotary member to be braked, indicated at 4. This member has secured to its opposite faces the friction linings 5 and 6. The steering axle, as best seen in Figure 2, has a flanged plate 7 to which is bolted the stationary plate or supporting disc-like member 8, the securing bolts being indicated at 9. This supporting plate has a threaded periphery 10 for rotatably and adjustably receiving the apertured disc or flanged secondary friction disc 11, which is provided with threads 12 engaging the threads 10 of the supporting plate. The outer periphery of this flanged disc is notched at 13, and a locking plate 14 is secured by studs 15 to the back of the supporting plate 8 and has a notched flange portion 16 adapted to engage the notches 12 and lock the flanged disc against rotary movement.

The central aperture in the disc 11 is to receive the hub portion 2 of the wheel and its driving studs 3, and the disc has radial reenforcing ribs 17 serving as cooling means to dissipate the heat generated during the braking action. The inner face of this backing plate is provided with a braking surface 18 adapted to be engaged by the friction lining 6 of the rotary member 4.

The supporting plate 8 is formed with an annular braking cylinder 19 disposed near the periphery of the plate and facing the rotary member 4, the area of this cylinder being at least equal to the operative area of the face of the brake lining 5. An annular piston member 20 is movably disposed within the cylinder 19 and arranged for movement toward and away from the rotary member 4, and also disposed for relative rotative movement with respect to the supporting plate. The braking piston member 20 is provided with grooves 21 and 22 to receive suitable packing rings to prevent leakage of the pressure fluid between the piston and the walls of the cylinder.

The supporting plate 8 is suitably ribbed both exteriorly and interiorly, as indicated at 23 and 24 in Figures 1, 6 and 7, in order to reduce the weight, reenforce the plate against warpage, and provide heat dissipating means therefor. A fluid pressure supply opening or nipple 25 is provided in the outer portion of the supporting plate 8' for admitting the pressure fluid into the cylinder 19 to move the piston into engagement with the member to be braked to provide for preliminary braking action. At the lower portion of the brake, I provide a drain plug 26 having a small relief opening therein to permit escape of any moisture that should collect in the bottom of the brake cylinder or annular channel when compressed air is used as the operating medium.

Equally spaced around the stationary plate and within the pressure cylinder thereof are a plurality of camming inserts 27. The camming inserts each comprises a camming member 28 secured against rotation in the piston 20, a camming member 29 recessed in the stationary plate 8 in the base of the cylinder, and a camming roller 30 disposed between the two camming members. The camming member 29 is of special form and is disposed on anti-friction bearings 31 so as to be freely rotatable in its recess. Tension means 32 for moving the braking piston away from the member to be braked is provided, extending into the braking cylinder intermediate each pair of camming insert units.

Referring to Figure 5, the piston retracting means comprises a link member 33 which is pivotally carried in an apertured disc 34 fitted in a recess 35 in the inner face of the annular piston 20. This plate is secured by fastening screws 36.

The outer portion of the supporting disc 8 is provided with internally-threaded recessed bosses 37, each having a reduced opening through which one of the link members 33 projects into the cylinder 19. A coiled spring 38 surrounds each link member and is disposed under tension with one end engaging the bottom of the recess in the boss while the other end engages a disc 39 fitted on the end of the link member 33 and limited against outward movement by the stop pin 40 extending through the end portion of the link.

A closure or plug 41 is tightly screwed into the recess 33 to prevent any leakage of the pressure fluid medium out of the cylinder 19.

In the operation of my brake, pressure is applied in the conventional manner to the fluid pressure medium which enters the inlet nipple 25 and the cylinder 19, forcing the braking piston into engagement with the rotary member to be braked 4. The member 4 slides axially on the driving lugs 3 and engages the braking surface 18 of the adjustable backing plate 11. This produces a preliminary braking action or drag on the annular piston 20, causing the same to be rotated slightly relative to its supporting disc 8, and the camming inserts 28 and 29 of Figure 9 are shifted out of alinement causing the rollers 30 to exert additional or servo action on the annular braking piston 20, forcing the same into tighter braking engagement, or, as is commonly known, producing servo braking action. As the piston moves out and is rotated relative to its supporting disc, the link members 33 of Figure 5 are moved to compress the springs 38, and, at the end of the brake application when the pressure on the braking fluid is released, these spring members withdraw the braking piston away from the brake ring or rotary member to be braked, and the inclined camming surfaces of the inserts 28 and 29 tend to reversely rotate the piston member in its supporting disc as it is returned to its disengaged position.

After extended periods of use and it is desirable to take up for wear of the brake lining and parts, the securing bolts 15 for the locking plates 14 are removed, which releases the flanged disc so that it may be rotated on the screw threads 10 on the periphery of the supporting disc 8, which will move the flanged disc 11 toward or away from the stationary supporting disc 8, depending upon in which direction the flanged disc is rotated.

Referring to Figure 13, I may employ a ratchet lever for adjustment of the flanged disc 42, which is positioned with its pawl 43 in engagement with the notched periphery 13 of the flanged disc 11. The lever 43 is pivotally secured to the stationary disc 8 by one of the fastening studs 15 for the locking plate 14, and reciprocation of the lever will rotate the flanged plate 17 with respect to the stationary supporting plate 8 until the proper braking adjustment is made, after which the fastening stud 15 is removed, and the two locking plates 14 replaced and secured in place.

While my improved brake is primarily designed for use with a low pressure fluid medium, such as air, it is within the purview of my invention to utilize a hydraulic or liquid type of pressure fluid, which, due to the large operative area of the annular piston head and the effective servo action when the braking surface of the piston engages the rotary member to be braked, may be at a considerably lower pressure than that generally used in the conventional fluid-operated brakes. The employment of this low pressure type of brake reduces the leakage tendency to a minimum. The disposition of the servo camming means within the pressure cylinder has certain advantages, in that the rollers and camming surfaces are completely enclosed, thus effectively protecting them from dirt or other foreign matter, and, consequently, their life will be considerably longer than the usual exposed type of servo camming means.

Since the camming inserts and rollers are disposed within the pressure cylinder and completely encased, not only is dust and foreign matter effectively prevented from reaching the servo operating parts but when a liquid fluid medium is used to produce the primary braking pressure on the piston within the cylinder, this medium may have lubricating qualities which provide adequate lubrication for the servo camming mechanism.

While my brake is disclosed as mounted on the front wheel of a vehicle, it is contemplated that the brake may be applied with equal simplicity to the rear wheels of a vehicle, or, in fact, to any rotary member which is to be braked.

What I claim as new and desire to secure by Letters Patent is:

1. In a brake construction of the class described, a stationary supporting disc-like member having an annular pressure cylinder formed in the wall thereof adjacent the periphery of said member, a relatively rotatable annular piston member disposed in said cylinder having an annular braking face, an apertured flanged relatively stationary brake disc adjustably secured to the stationary supporting disc, and having an annular braking surface disposed in spaced relation to said braking surface of said piston member, a rotary member to be braked interposed between the braking surfaces aforesaid, and camming means disposed in said cylinder between the stationary supporting disc and the annular piston and operable by the piston upon relative rotation between the same and the stationary supporting disc to move the brake piston toward said member to be braked and toward the braking surface of the flanged disc.

2. In a brake construction of the class described, a stationary supporting disc having an annular piston chamber therein, a brake piston of annular form disposed in said chamber, camming means within said chamber between said stationary supporting disc and said piston for camming said piston outwardly of said cylinder, and a member to be braked engageable by said brake piston upon outward movement thereof by said camming means.

3. In a brake construction of the class described, a stationary brake disc member, a second stationary flanged brake member adjustably carried by the first member, one of said members having formed therein near its periphery an annular fluid pressure cylinder, means for admitting a pressure fluid into said cylinder, an annular piston brake member disposed in said cylinder, and energizer means disposed within said cylinder for moving said piston brake member outward in said cylinder and toward the other stationary brake member, and a member to be braked disposed between said last braking member and said piston brake member.

4. In a brake construction of the class described, a stationary brake disc member, a second stationary brake disc member adjustably carried by the first member in parallel spaced relation thereto, one of said members having an annular cylinder formed therein near its periphery, an annular piston disposed in said cylinder and having a limited rotary movement with respect to said member in which it is mounted, energizer camming means disposed within the cylinder between the piston and its mounting member, said energizer means being operable by the limited relative rotative movement aforesaid to mechanically move the piston toward the other disc member, a member to be braked disposed between the piston and the last-mentioned other disc member for braking engagement therewith to slightly rotate the piston member and operate said energizer camming means to produce a braking action, and means for admitting a pressure fluid into said cylinder to move the piston into engagement with the member to be braked to produce a preliminary braking action and effect relative rotative movement of said piston.

5. In a fluid pressure operated brake, a pair of opposed spaced parallel walled disc-like members, one of said members having a cylinder formed in the wall thereof, and the other member having a braking surface on its wall facing said cylinder, a piston movably mounted in the cylinder to move in two directions and having a braking surface opposite the first-mentioned braking surface on the disc-like member and movable toward the same, means for admitting a fluid pressure medium into said cylinder to move the piston in one of its directions of movement, supplemental piston moving means disposed in the cylinder between the piston and its supporting disc-like member operable upon preliminary movement of said piston in one direction to move the same in the other direction toward the braking surface on the opposing parallel disc-like member, and a member to be braked disposed between the braking surfaces aforesaid of the piston and the disc-like member.

6. In a fluid pressure operated servo brake of the class described, a rotary member to be braked, a supporting member disposed adjacent thereto having a wall parallel to and spaced from said member to be braked and formed with an annular braking piston pressure cylinder facing the member to be braked, an annular braking piston having a braking surface engageable with said rotary member and slidably and rotatably mounted in the cylinder to move toward and away from the said rotary member, means for admitting a fluid pressure medium into said cylinder to move the piston into contact with the rotary member to produce a preliminary braking action and rotate said piston in said cylinder to produce a servo braking, and camming means within said cylinder operable by the rotative movement aforesaid to engage the piston and force the same into greater braking engagement with the member to be braked.

7. In a fluid pressure operated servo brake of the class described, a rotary member to be braked, a supporting member disposed adjacent thereto having a wall parallel to and spaced from said member to be braked and formed with an annular braking piston pressure cylinder facing the member to be braked, an annular braking piston having a braking surface engageable with said rotary member and slidably and rotatably mounted in the cylinder to move toward and away from the said rotary member, means for admitting a fluid pressure medium into said cylinder to move the piston into contact with the rotary member to produce a preliminary braking action and rotate said piston in said cylinder to produce servo braking, camming means within said cylinder operable by the rotative movement aforesaid to engage the piston and force the same into greater braking engagement with the member to be braked, and brake release means mounted within the pressure cylinder for moving the piston away from said rotary member upon reduction of the pressure of the pressure medium in said cylinder.

8. In a fluid pressure operated servo brake of the class described, a rotary member to be braked, having an axial component of movement, a supporting disc-like member disposed adjacent the member to be braked and having a wall parallel to and spaced from said rotary member and formed with an annular pressure cylinder facing the rotary member adjacent the peripheral portion thereof, an annular braking piston having a braking surface engageable with said rotary member to produce a braking action and slidably mounted in said cylinder to move toward and away from said rotary member, means for admitting a fluid pressure medium into said cylinder to move the piston into braking engagement with said rotary member, piston returning means disposed within said cylinder for yieldably resisting movement of the braking piston and for moving the braking piston away from said rotary member, and a backing plate adjustably carried by said supporting disc-like member for braking engagement with said rotary member and to resist axial movement thereof.

9. In a fluid pressure operated servo brake of the class described, a rotary member to be braked having an axial component of movement, a supporting disc-like member disposed adjacent the member to be braked and having a wall parallel to and spaced from said rotary member and formed with an annular pressure cylinder facing the rotary member adjacent the peripheral portion thereof, an annular braking piston having a braking surface engageable with said rotary member to produce a braking action and slidably mounted in said cylinder to move toward and away from said rotary member and also rotatably mounted in said cylinder to be rotated by said rotary member upon preliminary braking engagement, means for admitting a fluid pressure medium into said cylinder to move the piston into braking engagement with said rotary member, piston returning means disposed within said cylinder for yieldably resisting movement of the braking piston and for moving the braking piston away from said rotary member, a backing plate adjustably carried by said supporting disc-like member for braking engagement with said rotary member and to resist axial movement thereof, and servo camming means mounted within the pressure cylinder and carried by the piston and the supporting plate at each side of said piston returning means and operable by relative rotative movement of the piston in the cylinder, said camming means being located between the piston and its supporting disc member to move the piston into greater braking engagement with the member to be braked to produce a servo braking action.

10. In a fluid operated servo brake of the class described, a rotary member to be braked, a stationary supporting disc-like member disposed adjacent the member to be braked having a side wall parallel to and spaced from one side of said rotary member and formed with an annular brake piston receiving cylinder facing the outer portion of said rotary member and having camming insert receiving recesses formed in the base of said cylinder, a backing plate adjustably secured to said supporting disc-like member and engageable with the opposite side of the rotary member, an annular braking piston slidably and rotatably mounted in the cylinder aforesaid for braking engagement with the rotary member and having camming insert receiving recesses formed in its opposite face opposite the aforesaid recesses in the base of the cylinder of the disc-like member, opposing camming inserts mounted within said recesses, one of said camming inserts having anti-friction mounting means to permit free rotative movement of the insert in its recess, means for fixing the opposing camming insert in its recess, a camming roller disposed between said opposing inserts, and means for admitting a pressure fluid medium into said cylinder to move the piston braking member into contact with the rotary member to be braked to produce a preliminary braking action and cause relative rotary movement of the said piston within said cylinder to cause relative shifting movement between the opposing camming inserts and effect a servo braking action between the piston member and the rotary member.

11. In a fluid operated servo brake of the class described, a rotary member to be braked, a stationary supporting disc-like member disposed adjacent the member to be braked having a wall parallel to and spaced from one side of said rotary member and formed with an annular brake piston receiving cylinder facing the outer portion of said rotary member and having camming insert receiving recesses formed in the base of said cylinder, a backing plate adjustably secured to said supporting disc-like member and engageable with the opposite side of the rotary member, an annular braking piston slidably and rotatably mounted in the cylinder aforesaid having a braking face for braking engagement with the rotary member and having camming insert receiving recesses formed in its opposite face opposite the aforesaid recesses in the base of the cylinder of the disc-like member, opposing camming inserts mounted within said recesses, one of said camming inserts having anti-friction mounting means to permit free rotative movement of the insert in its recess, means for fixing the opposing camming insert in its recess, a camming roller disposed between said opposed inserts, means for admitting a pressure fluid medium into said cylinder to move the piston braking member into contact with the rotary member to be braked to produce a preliminary braking action and cause relative rotary movement of the said piston within said cylinder to cause relative shifting movement between the opposing camming inserts and effect a servo braking action between the piston member and the rotary member, and piston returning tension means disposed within the cylinder and connected to said piston and its said supporting member for moving the piston out of engagement with the rotary member, upon reduction of the pressure within said cylinder and for reversely rotating said piston member in said cylinder.

12. In a fluid operated servo brake of the class described, a rotary member to be braked, a stationary supporting disc-like member disposed adjacent the member to be braked having a side wall parallel to and spaced from one side of said rotary member and formed with an annular brake piston receiving cylinder facing the outer portion of said rotary member and having spaced pairs of camming insert receiving recesses formed in the base of said cylinder, a backing plate adjustably secured to said supporting disc-like member and engageable with the opposite side of the rotary member, an annular braking piston slidably and rotatably mounted in the cylinder aforesaid having a surface on one face for braking engagement with the rotary member and having spaced pairs of camming insert receiving recesses formed in its opposite face opposite the aforesaid recesses in the base of the cylinder of the disc-like member, opposing camming inserts mounted within said recesses, one of said camming inserts having free rotative movement in its recess, means for fixing the opposing camming insert in its recess, a camming roller disposed between said opposed inserts, means for admitting a pressure fluid medium into said cylinder to move the piston braking member into contact with the rotary member to be braked to produce a preliminary braking action and cause relative rotary movement of the said piston within said cylinder to cause relative shifting movement between the opposing camming inserts and effect a servo braking action between the piston member and the rotary member, and piston returning tension means extending into the cylinder intermediate each pair of camming inserts and connected to said piston and its said supporting member for moving the piston out of engagement with the rotary member, upon reduction of the pressure within said cylinder and for reversely rotating said piston member in said cylinder.

13. In a low pressure fluid-operated servo brake of the class described, a rotary member to be braked having opposite annular brake-engaging faces, a relatively stationary supporting disc-like member having a brake piston receiving cylinder facing one of the braking surfaces and having a piston receiving area substantially co-extensive therewith, an annular braking piston slidably and rotatably mounted in said cylinder to move toward and away from the braking faces of the member to be braked and slightly rotatable with the member to be braked upon engagement therewith, and also rotatable reversely thereto upon disengagement therefrom, means for admitting fluid pressure into said cylinder to move said piston into contact with the rotary member to cause rotary movement thereof, opposed sets of camming inserts and intermediate rollers mounted in said chamber between the piston and the disc-like member and operable by the relative rotative movement between the same and its mounting disc to produce a servo-camming action on the rotary member to be braked, and resilient tensioning means carried by the stationary supporting member and disposed in the cylinder between the piston and the stationary supporting member for yieldably resisting rotary and sliding movements of the piston member.

14. In a servo brake of the class described, a rotary member to be braked, a stationary supporting plate member disposed at one side thereof, a relatively rotatable braking member carried by said supporting plate member and engageable with the member to be braked to effect relative rotation of the relatively rotatable member with respect to the stationary member, servo camming means between said supporting plate member and said relatively rotatable member operable by the relative rotation aforesaid between said members to produce a braking action, said stationary plate member and relative rotatable braking member having means for enclosing and completely sealing the servo camming means therebetween.

15. In a servo brake of the class described, a rotary member to be braked, a stationary supporting plate member disposed at one side thereof, a relatively rotatable braking member carried by said supporting plate member and engageable with the member to be braked to effect relative rotation of said relatively rotatable braking member with respect to the stationary member, servo camming means between said supporting plate member and said relatively rotatable member operable by the relative rotation aforesaid between said members to produce a braking action, said relatively stationary and rotatable members cooperating to form a sealed chamber in which said servo camming means are disposed, and means extending into said chamber between said plate member and said relatively rotatable member for tensioning the last member toward said plate member.

16. In a brake of the class described, a rotary member to be braked, a supporting disc-like member having braking means carried thereby for braking engagement with said rotary member, a backing plate having threaded engagement with said supporting member for rotative adjustment toward and away from said supporting plate and the braking means and having a notched periphery, a locking plate removably secured on said supporting member and having means for interlockingly engaging said notched periphery of the backing plate to lock the same against rotation, and means interchangeable with said locking plate for rotating said backing plate to adjust the same.

17. In a brake of the class described, a rotary member to be braked, a supporting disc-like member having braking means carried thereby for braking engagement with said rotary member, a backing plate having threaded engagement with said supporting member for rotative adjustment toward and away from said supporting plate and the braking means and having a notched periphery, a locking plate removably secured on said supporting member and having means for interlockingly engaging said notched periphery of the backing plate to lock the same against rotation, and means interchangeable with said locking plate for rotating said backing plate to adjust the same, said last-named means comprising a ratchet lever having a pawl pivotally mounted thereon for engagement with the notched periphery of the backing plate.

18. In a compressed air brake of the class described, a stationary brake disc member, a second stationary flanged brake member adjustably carried by the first member, one of said members having formed therein near its periphery an annular cylinder, means for admitting air under pressure into said cylinder, an annular piston brake member disposed in said cylinder and initially operable by the air pressure within the cylinder, energizer means disposed within said cylinder for moving said piston brake member outwardly of the cylinder and toward the other stationary brake member, and a member to be braked disposed between said last-mentioned braking member and said piston brake member and adapted to have braking engagement with both braking members.

HOMER T. LAMBERT.